United States Patent [19]

Matsuda et al.

[11] Patent Number: 4,475,369
[45] Date of Patent: Oct. 9, 1984

[54] METHOD FOR PRODUCING CLEAN COLD STRIP

[75] Inventors: Yukio Matsuda, Ibaraki; Tsutomu Ueno, Chiba, both of Japan

[73] Assignee: Sumitomo Metal Industries, Ltd., Osaka, Japan

[21] Appl. No.: 409,106

[22] Filed: Aug. 18, 1982

[51] Int. Cl.³ .......................... B21B 9/00; B21B 45/08
[52] U.S. Cl. .............................................. 72/38; 72/39
[58] Field of Search ...................... 72/38, 39, 200, 202, 72/364, 365; 134/9, 14, 15, 16, 19; 148/12 R, 12.1

[56] References Cited

U.S. PATENT DOCUMENTS

| | | | |
|---|---|---|---|
| 3,244,565 | 4/1966 | Mayer et al. | 148/12.1 X |
| 3,505,844 | 4/1970 | McLean | 72/42 |
| 3,615,903 | 10/1971 | Perry et al. | 148/12.1 |
| 3,826,693 | 7/1974 | Fisher | 148/12.1 |
| 4,043,166 | 8/1977 | Leroy | 72/39 |
| 4,344,308 | 8/1982 | Shimada et al. | 72/39 |

OTHER PUBLICATIONS

Metals Handbook, "Furnace Atmospheres", vol. 2, 8th Edition, 1964, p. 68.

Primary Examiner—E. Michael Combs
Attorney, Agent, or Firm—Burns, Doane, Swecker and Mathis

[57] ABSTRACT

A clean cold strip is produced by injecting at a high pressure a rolling mill lubricant emulsion of a low concentration to both the sides of a strip at the last stand of a rolling mill, thereby removing oil and metal dust therefrom, charging the cold strip as rolled into a box annealing furnace, mixing water steam with an atmospheric gas of the annealing furnace consisting mainly of nitrogen and hydrogen, and adjusting the dew point of the gas within the furnace to 0°–10° C.

2 Claims, 3 Drawing Figures

METHOD FOR PRODUCING CLEAN COLD STRIP

BACKGROUND OF THE INVENTION

The present invention relates to a method for producing a clean cold strip.

In cold rolling of a steel strip, cold rolling mill lubricants such as mineral oil, beef tallow, synthetic oil, or the like are used to ensure cooling and lubrication of the mill rolls. On the surface of a strip after cold rolling, there are usually attached stains of the cold rolling mill lubricant used in the rolling and metal dust produced by abrasion during the rolling operation. When the strip coil with such stains remaining thereon is annealed, these stains are charred and adhered to the surface of the strip as surface smudges, thereby considerably spoiling the surface appearance to lower the commercial value and considerably damaging the coating and the resistance to corrosion.

When using such cold strip as a raw plate for plating, the smudges remaining firmly on the surface of the strip are not removed by pretreatment for plating, causing serious defects on the surface of the product preventing a firm coating from being formed, whereby the product is spoiled in appearance and considerably reduced in resistance to corrosion. Further, when using such cold strip as a raw plate for coating, a sound surfacing coat of such material as phosphate is not formed, thereby reducing considerably the property of the plate for coating.

For this reason, when high cleanness in the surface is required, a cold rolled strip has usually been cleaned in the surface by a cleaning line before annealing. However, such cleaning line requires additional energy such as electricity and water steam, detergent such as alkali, expendables such as brushes, and labor, thereby increasing the total production cost.

In cold rolling or annealing, accordingly, there have been heretofore practised various methods for cleaning the surface of a strip without using a cleaning line. However, none of them have been satisfactory in cost or in cleaning effect.

Some of the methods heretofore employed in cold rolling for cleaning the surface of the strip are as follows:

(1) Detergent Method

According to this method, water or a detergent is injected generally at the pressure of 10 Kg/cm$^2$ or lower onto the surface of the strip at the last stand or pass to purge the surface of the strip from the oil and metal dust.

However, use of water is liable to cause surface defects such as rust and water stain, to worsen the rolling mill lubrication, to lower the rolling efficiency, to make the rolling of thin articles difficult, and to produce a large quantity of metal dust causing smudges.

Further, use of a detergent is too costly in proportion to effects obtained thereby and has such additional problems that decrease in rolling mill lubrication and necessity for disposal of waste fluid.

(2) High Pressure Detergent Injection Method

In this method, a detergent at high pressure and at high temperature is injected onto the surface of the strip in the final rolling. A typical example of this method is disclosed as "Clean Cold Rolling Method" in Japanese Patent Publication No. 19682/80. According to this method, while the cleaning efficiency is greatly improved, use of water and/or detergent causes rust and decrease in lubricating property, leading to production of metal dust by abrasion, resulting in such problems as smudges after annealing.

(3) Mill Clean Method

In this method, a rolling mill lubricant emulsion used for cooling and lubrication of the rolling mill is improved in annealing evaporative property. According to this method, it is intended that the rolling mill lubricant remaining on the surface of the strip will not be charred during annealing but will be decomposed and evaporated to prevent the property of the strip surface from being worsened. In this method, however, the cleaning effect obtained thereby is small and the lubricating property has to be sacrificed because it is difficult to obtain a rolling mill lubricant emulsion having both the lubricating property and the evaporating property during annealing.

(4) Annealing Gas Cleaning Method

In this method, steam is mixed with an atmospheric gas consisting mainly of $N_2$ gas and $H_2$ gas to make the furnace gas decarburizing, to thereby remove the residual carbon produced during annealing by the oil attached on the surface of the strip. Typical examples of this method are disclosed by, for example, Japanese Patent Publications Nos. 23817/71, 43401/73 and 18125/77. According to this method, although a gas cleaning effect is recognized, when the amount of the oil and metal dust attached on the surface of the material to be annealed, that is the cold strip, is a certain value, for example, 100 mg/m$^2$ or above, the effect is limited. Conversely, when the amount of the steam to be mixed is increased, while the gas cleaning effect is increased there is caused local decarburization in the strip, resulting in defects in the quality of the product. In detail, in box type coil tight annealing, the local decarburization in the inner and the outer peripheral edges of the strip coil necessitates it that the amount of the steam to be mixed for gas cleaning be limited, resulting in a failure to provide the desired cleaning effect.

SUMMARY OF THE INVENTION

An object of the present invention is to provide an economical and simple method for producing a clean cold strip, capable of providing a cold strip coil with a cleaning effect equivalent to that by a conventional cleaning line without using it, and annealing the cold strip coil with none or least possible smudges thereon.

The inventors have found experimentally that the cleaning effect of the rolling mill lubricant emulsion injected onto the surface of the strip in cold rolling is dependent upon the pressure, flow rate, angle, and temperature of the injection of the lubricant emulsion and is independent from the kind of the lubricant if its concentration is less than 4%.

Accordingly, a satisfactory cleaning effect can be achieved by using a rolling mill lubricant emulsion of a concentration of approximately 4% in the stands other than the last and injecting a rolling mill lubricant emulsion of a low concentration at a high pressure onto the surface of the strip in front of the last stand.

However, since the lubricant emulsion of the same concentration used in other stands has to be used in the last stand also for the reason described above, the oil of the lubricant emulsion will be attached again to the surface of the strip to spoil its cleanness. Conversely, when a lubricant emulsion of a concentration lower than 0.5% is used, there will be caused various problems such as rust, water stains, decrease in rolling efficiency due to the decrease in lubrication, production of a large amount of metal dust due to the decrease in rolling efficiency, and occurrence of smudges due to the metal dust attached to the surface of the steel strip, as in the case where water is used in the last stand.

As will be seen from the above description, various problems caused by the detergent method using water or a detergent can be solved by injecting at a high pressure a rolling mill lubricant emulsion of the concentration of 0.5-2.0% onto the surface of the strip at the entrance or exit of the last stand and injecting at a low pressure a rolling mill lubricant emulsion of the same concentration to the rolls as a lubricant.

In the high pressure detergent injection method described hereinabove, an oil separator is necessary to use the detergent repeatedly. In the method according to the present invention, however, since a rolling mill lubricant emulsion of a low concentration of 0.5-2.0% is used, it is not required to provide an oil separator but it is required only to control the concentration of the lubricant emulsion to the range of 0.5-2.0%.

The lubricant emulsion is injected preferably at the pressure within the range of 50-200 Kg/cm$^2$ because the cleaning effect is very poor when the injecting pressure is lower than 50 Kg/cm$^2$ and, on the other hand, said effect is saturated when the pressure is in the range exceeding 200 Kg/cm$^2$.

The flow rate of the injection of the lubricant emulsion is preferably in the range of 20-150 l/min per 100 mm width on one side of the strip. In the range of the flow rate lower than 20 l/min the cleaning effect is very poor and, on the other hand, in the range of the flow rate exceeding 150 l/min the cleaning effect is saturated and the drainage of water becomes very poor.

In the method according to the present invention, the clean cold strip obtained in the way described above is charged into a box type coil tight annealing furnace filled with an atmospheric gas consisting mainly of nitrogen ($N_2$) and hydrogen ($H_2$) (for example, Ax gas of $N_2$ 75% and $H_2$ 25%) and mixed with water steam. The dew point of the furnace gas is adjusted to the range of 0°-10° C. because when the dew point is lower than 0° C. the cleaning effect is poor and, on the contrary, when the dew point exceeds 10° C. local decarburization occurs in the strip.

In the method according to the present invention, since contamination of the strip is held to a very low level, it is not necessary to mix a large amount of water steam for gas cleaning and, accordingly, no local decarburization is caused during annealing.

DETAILED DESCRIPTION OF THE PREFERRED EMBODIMENTS

Figure 1:
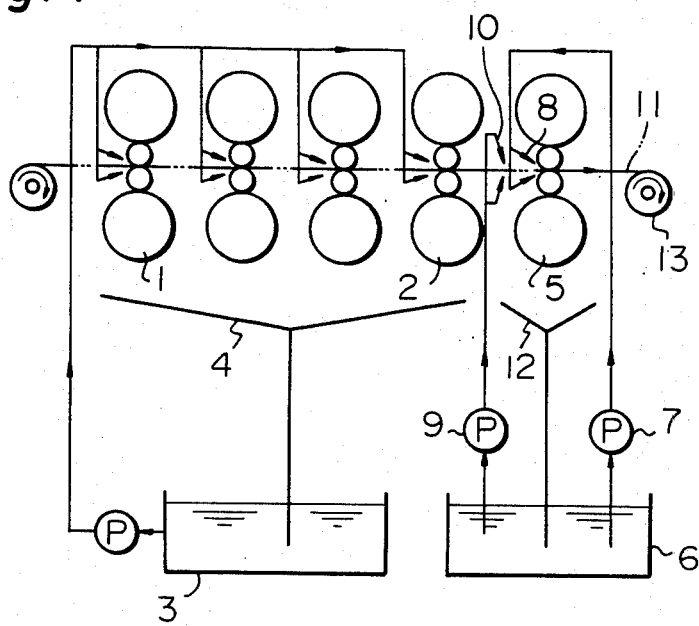
FIG. 1 is a schematic illustration of the construction of a cold rolling mill for obtaining a cold strip coil, to which the method according to the present invention is applied.

Referring now to FIG. 1, a method for producing clean cold strip coil will be described. FIG. 1 shows the schematic construction of a conventional four-high five-stand continuous cold rolling mill, in which a rolling mill lubricant emulsion of a relatively high concentration of 3-5% is supplied from 1st tank 3 to 1st to 4th stands 1, 2. The used lubricant emulsion from these stands is received by a tray 4 and collected by the 1st tank 3 for repeated circulation.

Figure 2:
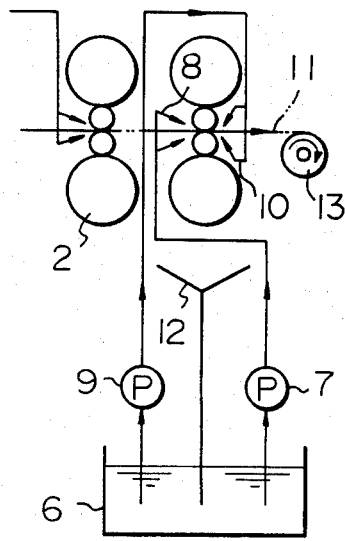
FIG. 2 is an illustration equivalent to that of FIG. 1, showing a portion of a modification of the method according to the present invention.
Figure 3:
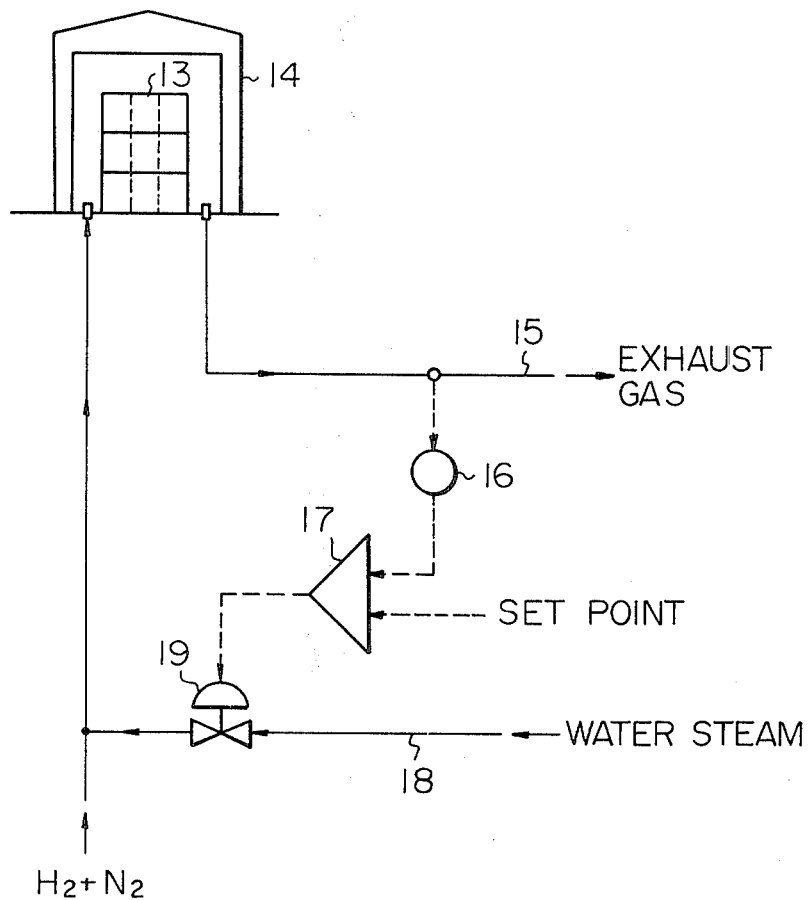
FIG. 3 is a schematic illustraiton of the construction of a box type annealing furnace for carrying out the method according to the present invention.

At the last or 5th stand 5, a lubricant emulstion of a low concentration of 0.5-2.0% is supplied to the rolls thereof from 2nd tank 6 through a low pressure pump 7 and injection nozzles 8. Further, the lubricant emulsion from the 2nd tank 6 is injected at a high pressure to both the sides of a strip 11 through a high pressure pump 9 and injection nozzles 10. The injection nozzles 10 may be on any of the entrance (FIG. 1) and exit (FIG. 2) sides of the 5th stand, but are preferably disposed on the entrance side thereof. The used lubricant emulsion is received by a tray 12 and collected by the 2nd tank 6 for repeated circulation.

A cold strip coil 13 obtained in this way is charged into a common box type annealing furnace 14 into which an atmospheric gas consisting mainly of $H_2$ and $N_2$ and water steam are supplied through an inlet port and discharged as an exhaust gas through an outlet port.

The dew point within the annealing furnace is controlled in the way described below. That is, a dew point meter 16 is attached to an exhaust gas pipe 15 communicated with the annealing furnace 14. A detection signal from the dew point meter 16 is applied to an adder 17 for comparison with a set-point, and a correction signal is applied to a flow rate control valve 19 disposed in a water vapor supply pipe 18 to control the amount of the water vapor to be supplied.

Now, certain examples of the method according to the present invention will be described below.

EXAMPLE I

1. Size of Starting Material
   2.8 mm thick × 1200 mm wide
2. Size of Finished Material
   0.7 mm thick × 1200 mm wide
3. Cold Rolling
   (1) Reduction 9% (at 5th stand)
   (2) Rolling Speed 1400 m/min
   (3) 1st-4th Stands
      Bright work rolls were used.
      Mineral lubricant emulsion of 3% concentration was used.
   (4) 5th Stand
      Dull work rolls were used.
      Mineral lubricant emulsion of 0.8% concentration was used.
   (5) Low Pressure Injection at 5th Stand (for lubrication of rolls)
      Pressure: 10 Kg/cm$^2$
      Temperature: 50° C.
      Flow rate: 4000 l/min
   (6) High Pressure Injection at 5th Stand (for cleaning the surface of strip)
      Pressure: 100 Kg/cm$^2$
      Temperature: 50° C.
      Flow rate: 50 l/min (100 mm width on one side)
      Injection nozzle: Sector nozzle; Injection angle 30°; Torsional angle 30°;
      Angle of inclination of nozzle: 60° with respect to the direction of movement of strip
      Distance between injections: 300 mm
4. Batch Tight Annealing Condition Water vapor was blown into the atmospheric gas consisting mainly of $N_2$ and $H_2$ gases and the dew point within the furnace was maintained at 5° C. Soaking temperature was 670° C. and annealing period was 15 hours. Blowing of water vapor was begun at the time of beginning of soaking and stopped when the coil temperature reached 500° C. during cooling after soaking.

5. Result

The amount of smudges inclusive of oil and metal dust attached on the surface of the strip after cold rolling was 50 mg/m². After the strip coil was annealed, a filter paper wiping test revealed that the strip was far cleaner than strips passed through a common electrolytic cleaning line. A test by Ford method showed that the amount of carbon remaining on the surface of the strip was only 1 mg/m². Appearance of the product was free from such problems as rust or water stain.

Further, the strip was free from the problem of local decarburization after annealing and was much better than the strips passed through the common electrolytic cleaning line in resistance to corrosion after chemical processing and coating.

EXAMPLE II

Table 1 shows the results of practice of the method according to the present invention with rolling mill lubricant emulsion and annealing condition from those of Example I.

rolling mill lubricant emulsion of concentration lower than 4%.

In actual rolling operation, it is usually difficult because of limitation in equipment to isolate the lubricant emulsion at the rolls of the last stand from the liquid injected at high pressure onto the surface of the strip in front of the mill. Therefore, even though a desired cleanness is obtained by a high pressure injection in front of the mill, if a lubricant emulsion of a concentration higher than 2.0% is used at the last stand, although the amount of metal dust by abrasion of the rolls is reduced, the amount of attached oil is increased, resulting in increase of the amount of smudges attached to the surface of the strip after cold rolling. In the case where water or a detergent is used, decrease in lubrication produces much metal dust by abrasion of the rolls to make the surface cleanness of the strip worse.

In annealing step, as seen from FIG. 1, the surface cleanness is much improved in any of the cases by blowing water steam into the furnace and maintaining the dew point of the furnace gas to approximately 5° C. Particularly, the amount of the residual carbon measured by Ford method was the smallest, that is 1 mg/m², in case 5 of Table 1, which is much better than in other materials passed through an electrolytic cleaning line and further very satisfactory also in resistance to corrosion.

Judging from these experimental results, when the surface cleanness of the coil charged into the annealing furnace is a given level or lower, for example, when the amount of oil and metal dust attached on the surface is 50 mg/m² or lower, the effect of mixing water vapor with the annealing atmosphere is very great in removing the residual carbon on the surface of the strip.

TABLE 1

| Case | Liquid Injected at High Pressure to Strip at or in Front of Last Stand of Cold Strip Mill | Amount of Smudges on the Strip after Cold Rolling (mg/m²) | Annealing Condition | Amount of Residual Carbon Measured by Ford Method (mg/m²) | Problem in Cold Rolling and Defect in Product | Decision |
|---|---|---|---|---|---|---|
| 1 | Water | 200 | — | 25 | Unsuitable for Sheet. Rust and Water Stain | Poor |
| 2 | Water | 200 | $H_2O$ Blown | 20 | Unsuitable for Sheet. Rust and Water Stain | Poor |
| 3 | Detergent | 150 | — | 20 | Unsuitable for Sheet. Rust and Water Stain | Poor |
| 4 | 0.8% Concentration Mineral Lubricant Emulsion | 50 | — | 5 | Satisfactory | Good |
| 5 | 0.8% Concentration Mineral Lubricant Emulsion | 50 | $H_2O$ Blown | 1 | Satisfactory | Excellent |
| 6 | 5.0% Concentration Mineral Lubricant Emulsion | 500 | — | 40 | Satisfactory | Poor |
| 7 | 5.0% Concentration Mineral Lubricant Emulsion | 500 | $H_2O$ Blown | 30 | Satisfactory | Poor |

On the other hand, it has been confirmed by other high pressure injection tests that, when the rolling speed of the strip is as high as 100 m/min, the degree of cleanness of the surface of the strip is univocally determined by the striking energy of the liquid irrespectively of the kind of the liquid used, such as water, detergent of Heretofore, about a half of cold strips had to pass through the cleaning line after cold rolling. According to the present invention, however, the percentage of the cold strips which must pass through the cleaning line can be reduced to zero, thereby achieving a great economy in energy and a substantial reduction of cost. Further, the yield rate of the product can be increased by approximately 0.2% by the improvement in the surface quality according to the present invention.

What is claimed is:

1. A method for producing a clean cold strip, comprising the steps of:

injecting a rolling mill lubricant emulsion having a concentration of 0.5–2.0 percent to both sides of a strip at the last stand of a cold rolling mill at a pressure of 100–200 Kg/cm$^2$ and a flow rate of 20–150 l/min per 100 mm width of the strip, thereby removing stains such as oil or metal dust from the surface of the strip;

charging the cold strip as rolled into a box annealing furnace;

mixing a water steam supply with an atmospheric gas of the furnace consisting mainly of nitrogen and hydrogen; and adjusting the dew point of the gas within the box annealing furnace to a temperature of 0–10° C.

2. A method as set forth in claim 1, including providing a box annealing furnace with a water steam supply pipe and an exhaust gas pipe containing a dew point meter;

detecting a signal from the dew point meter;

comparing said detected signal with a predetermined value to obtain a correction signal;

controlling a flow rate control valve provided in the water steam supply pipe in accordance with said correction signal; and monitoring the dew point of the atmospheric gas to a predetermined range of temperature in response to said flow rate control valve.

* * * * *